US012330167B2

(12) United States Patent
De Weldige

(10) Patent No.: US 12,330,167 B2
(45) Date of Patent: Jun. 17, 2025

(54) HIGH-PRESSURE ROLLER PRESS

(71) Applicant: MASCHINENFABRIK KÖPPERN GMBH & CO. KG, Hattingen (DE)

(72) Inventor: Eggert De Weldige, Velbert Langenberg (DE)

(73) Assignee: MASCHINENFABRIK KOEPPERN GMBH & CO. KG, Hattingen (DE)

(*) Notice: Subject to any disclaimer, the term of this patent is extended or adjusted under 35 U.S.C. 154(b) by 243 days.

(21) Appl. No.: 17/791,784

(22) PCT Filed: Dec. 14, 2020

(86) PCT No.: PCT/EP2020/085954
§ 371 (c)(1), (2) Date: Jul. 8, 2022

(87) PCT Pub. No.: WO2021/164919
PCT Pub. Date: Aug. 26, 2021

(65) Prior Publication Data

US 2023/0052046 A1 Feb. 16, 2023

(30) Foreign Application Priority Data

Feb. 20, 2020 (DE) ......................... 102020104526.3

(51) Int. Cl.
*B02C 4/28* (2006.01)
*B02C 4/02* (2006.01)
(Continued)

(52) U.S. Cl.
CPC ................ *B02C 4/283* (2013.01); *B02C 4/02* (2013.01); *B02C 4/10* (2013.01); *B02C 4/286* (2013.01);
(Continued)

(58) Field of Classification Search
CPC .. B02C 4/283; B02C 4/10; B02C 4/32; B02C 4/34; B02C 4/286; B02C 4/02
See application file for complete search history.

(56) References Cited

U.S. PATENT DOCUMENTS 331,017 A * 11/1885 Wild ........................ B02C 4/283 241/226
339,664 A * 4/1886 Krom ........................ B02C 4/32 241/230
(Continued)

FOREIGN PATENT DOCUMENTS

DE 665141 B 9/1936
DE 3635762 A 4/1988
(Continued)

*Primary Examiner* — Jared O Brown
(74) *Attorney, Agent, or Firm* — Andrew Wilford

(57) ABSTRACT

A high-pressure roller press has a press frame, fixed and movable compression rollers rotatable about respective roller axes in the press frame, each having axially opposite roller ends in turn having end faces, and together forming a compaction zone with a roller gap vertically level with the roller axes and having a gap width that is variable during operation of the roller press. Two end plates axially flank the compaction zone at the roller ends, are mounted on the press frame so as to be movable, and are prestressed to shift axially outward away from the respective roller end faces against a prestress force during operation of the roller press. Respective single end rollers rotatable about respective end-roller axes axially delimit the roller gap and are mounted on the end plates vertically level with the roller gap.

17 Claims, 3 Drawing Sheets

(51) Int. Cl.
*B02C 4/10* (2006.01)
*B02C 4/32* (2006.01)
*B02C 4/34* (2006.01)

(52) U.S. Cl.
CPC .................. *B02C 4/32* (2013.01); *B02C 4/34* (2013.01); *B02C 2201/02* (2013.01)

(56) References Cited

U.S. PATENT DOCUMENTS

| | | | | | |
|---|---|---|---|---|---|
| 647,894 | A | * | 4/1900 | Barmettler | B02C 4/283 241/226 |
| 667,777 | A | * | 2/1901 | Iler | B02C 4/32 241/234 |
| 1,050,183 | A | | 1/1913 | Wall | |
| 1,795,663 | A | * | 3/1931 | McGregor | B02C 4/283 241/226 |
| 1,889,777 | A | * | 12/1932 | Diederichs | B02C 4/283 241/226 |
| 2,063,363 | A | * | 12/1936 | Brasington | B02C 4/283 241/226 |
| 2,656,986 | A | * | 10/1953 | Brasington | B02C 4/283 241/226 |
| 2,904,829 | A | | 9/1959 | Heck | |
| 3,144,681 | A | * | 8/1964 | Krantz | B22F 3/18 425/367 |
| 3,899,842 | A | * | 8/1975 | Shneider | B42F 3/003 40/379 |
| 4,193,555 | A | | 3/1980 | Ruegger | |
| 4,231,729 | A | | 11/1980 | Tundermann | |
| 4,442,980 | A | * | 4/1984 | Oetiker | B02C 4/286 241/34 |
| 4,905,917 | A | * | 3/1990 | Fetzer | B02C 23/02 241/101.8 |
| 5,102,058 | A | * | 4/1992 | Mericle | B02C 4/283 241/226 |
| 5,269,477 | A | | 12/1993 | Buchholtz | |
| 5,386,946 | A | * | 2/1995 | Fetzer | B02C 4/286 241/34 |
| 2006/0255197 | A1 | * | 11/2006 | McIvor | B02C 4/283 241/226 |
| 2012/0061501 | A1 | | 3/2012 | Kounosu | |
| 2021/0121892 | A1 | | 4/2021 | Gardula | |

FOREIGN PATENT DOCUMENTS

| | | | | | |
|---|---|---|---|---|---|
| EP | 2505346 | A | | 10/2012 | |
| EP | 2314723 | A | | 3/2016 | |
| EP | 3358024 | A | | 8/2018 | |
| GB | 2341 121 | | * | 3/2000 | B02C 4/34 |

* cited by examiner

Fig.3
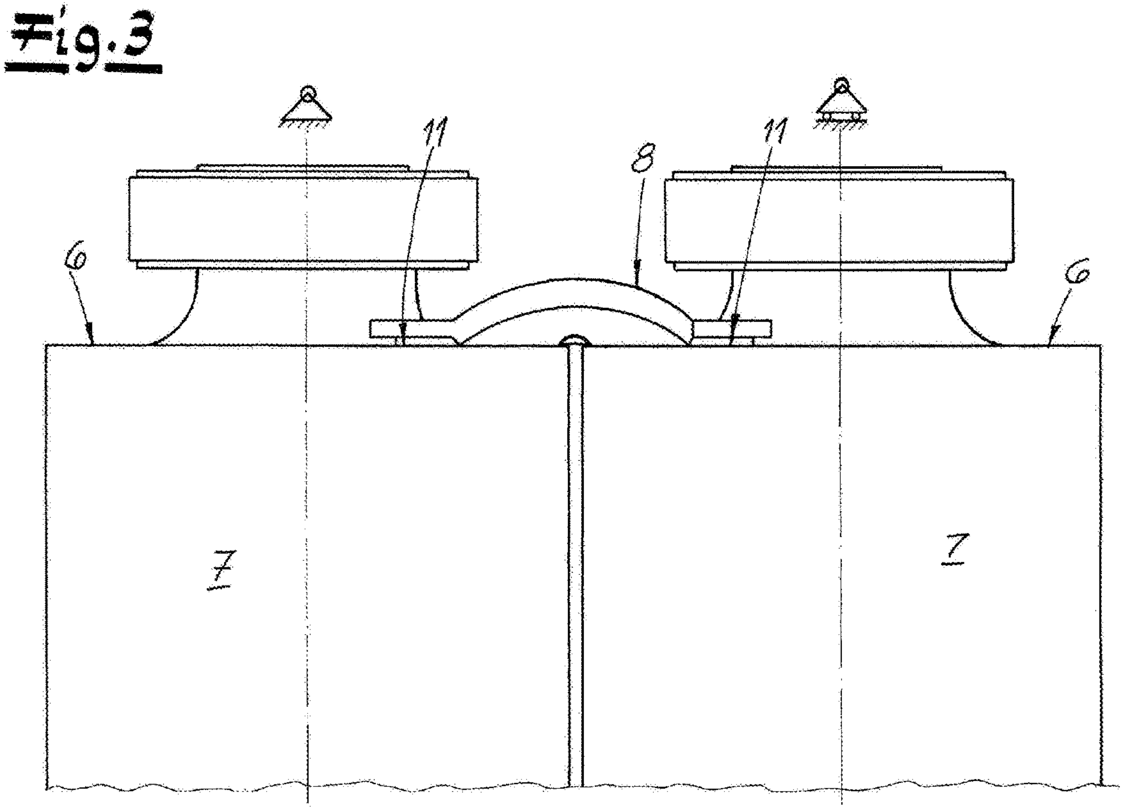
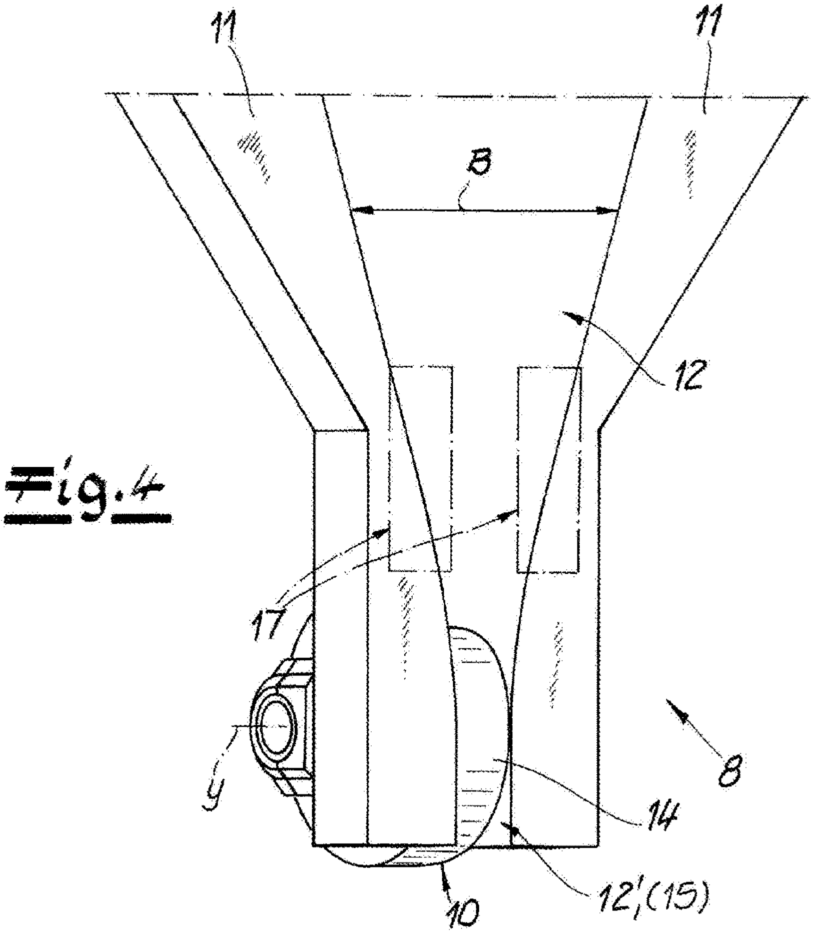
Fig.4

HIGH-PRESSURE ROLLER PRESS

CROSS REFERENCE TO RELATED APPLICATIONS

This application is the US-national stage of PCT application PCT/EP2020/085954 filed 14 Dec. 2020 and claiming the priority of German patent application 102020104526.3 itself filed 20 Feb. 2020.

BACKGROUND OF THE INVENTION

The invention relates to a roller or high-pressure press, in particular a particle-bed roller mill or crusher, having two compression rollers rotatable (and driven in opposite directions) in a press frame and between which a compaction zone with a roller gap vertically level with the roller axes is formed whose gap width is variable during operation, the compaction zone between the compression rollers (or the roller gap) being delimited on the roller ends by (two) end plates laterally flanking the compression rollers, the end plates being mounted on the press frame so as to be movable and biased (or prestressed) in such a way that the end plates can be moved back against the application of force during operation of the roller press (for example into a skewed position of a roller) and can thus also be angled.

Such a roller press is used in particular for the comminution of material, in particular of highly abrasive material, for example ore, cement clinker, slag or ceramic base materials or the crushing of for example fertilizers. The roller press is used for example for high-pressure comminution and is then also referred to as particle-bed roller mills. Alternatively, however, the roller press can also be used for crushing material. In bed roller mills, the individual particles of the feed material are not broken as in the case of a crusher between the surfaces of the two rollers, but rather are pressed into a web or belt under high pressure and are thus comminuted highly efficiently. When the material is compacted in a roller press, the feed material is pressed between the rollers to form a web (for example in the crushing of fertilizers). The two rollers of a roller press are driven in opposite directions. Preference is given to one of the compression rollers as a fixed roller and the other compression roller is a movable roller that can move relative to the fixed roller, namely away from the fixed roller with a variable gap width. For this purpose, the movable roller can be biased toward the fixed roller via force-generating means, for example hydraulically and/or pneumatically, and is thus supported so as to be likewise supported against a hydropneumatic spring. A minimum gap between the rollers is set when a certain pressure acts between the rollers. The gap width then results from the ratio of the pressing force of the hydraulic system to the reaction forces originating from the material to be processed.

Laterally, the roller gap or compaction zone is limited by end plates that are fastened to the press frame and that in practice are also referred to as "cheek plates" or "filling-funnel boundaries" or "hopper end plates." They are frequently adapted in their shape to the compaction zone (the "filling funnel") that tapers in a funnel shape in the direction of rotation of the compression rollers or in the conveying direction between the compression rollers.

If, in practice, a uniform supply of the feed material over the axial roller width cannot be ensured, an oblique position of the rollers relative to one another or the movable roller relative to the fixed roller is permitted, so that a rolling gap with a gap width not identical over the axial roller width can also be set during operation. In the case of compression rollers of conventional size, such a relatively skewed position is on the order of several millimeters to several centimeters. For this reason, the lateral end plates are not rigidly fastened to the press frame, but can be pressed back in a force-loaded manner, for example spring-loaded or else hydraulically biased. The use of such spring-mounted filling device end plates has proven to be excellent in practice.

However, the end plates are subject to high wear in practice. It is therefore known to provide the end plates with a wear protection layer. Thus for example DE 10 2018 113 440 (US 2021/0121892] describes a roller press in which, on the one hand, plate-shaped wear protection elements are used for the wear protection layer of the end plates and, on the other hand, pin-shaped wear protection elements are used in the high-compaction zone.

In order to reduce the friction in the region of the side end plates and thus the wear, it is proposed in WO 2006/124425 [US 2006/0255197] to provide on the lateral end plates a multiplicity of movable elements in a matrix that can be designed for example as rollers. The rollers distributed in a matrix-like manner on the "cheek plates" are intended to permit movement of the surface with the material and thus reduce the friction and consequently the wear.

In an alternative concept, lateral end plates fastened to the press frame are dispensed with and instead limiting elements, for example circumferential flanges, are fastened to one of the rollers themselves that are connected in a rotationally fixed manner to one of the rollers, so that these lateral flanges rotate with the rollers and consequently are moved with the speed of the material. In this way, the wear in the region of the limiting elements can be reduced. However, it is disadvantageous that these lateral flanges do not readily permit an inclined position of the movable roller, so that homogeneous feed must be ensured over the width of the machine. Such a roller mill is provided with lateral flanges for roll-gap limitation is described for example in DE 3,701,965. In order to enable a certain oblique position of the rollers even in the case of such a solution with lateral flanges, elastic deformation of the flanges is permitted in DE 10 2018 108690. However, such measures are relatively expensive.

Moreover, U.S. Pat. No. 6,474,894 discloses a roller press with a laterally fixedly mounted "cheek platform" and rollers that are provided in the region of the usually provided lower sections of the "cheek platform" that laterally delimit the pressing gap. They consequently replace the lower part of the conventional end plates and are intended in particular to reduce wear. However, both the cheek plates and the rollers are stationary during operation. Only for adjustment is movement of the rollers possible with the aid of screw bolts.

In the case of a roller press that serves for the production of briquettes, lateral filling-shaft boundaries are provided that have special wear protection means. For this purpose, a frame can be inserted into a cutout of the filling shaft that holds a plurality of rollers one after the other (cf. DE 665141).

Furthermore, a device for rolling strips of metal powder is known, in which a loose disk rotating with one of the rollers is on each side of the one roller for the lateral delimitation of the roll caliber (see DE 11 160 36). Similar devices are known from U.S. Pat. Nos. 2,904,829 and 4,231,729.

Moreover, roller presses for crushing directly reduced iron at high temperatures are also known (see EP 2 314 723 and EP 33358024). Lateral "cheek plates" are also provided in these presses. The "cheek plates" are provided in the upper region with recesses that allow the inclined arrangement of the screw conveyors.

DE 3635762 describes a roller mill in which the end walls of the supply chute are provided with special storage elements that are intended to have an open honeycomb structure.

EP 2 505 346 describes end plates for the briquetting of material with a high moisture content, where the end plates have a curved region into which special bodies are integrated so that drainage channels are formed.

Finally, U.S. Pat. No. 1,050,183 discloses a roller press with lateral end plates that are designed in the shape of a box and form material pockets for receiving material.

OBJECT OF THE INVENTION

Proceeding from the previously known prior art, the object of the invention is to provide a high-pressure roller press, in particular a particle-bed roller mill or crusher, of the type described above that are distinguished by an improved operating mode and in particular a high throughput with a simple construction.

SUMMARY OF THE INVENTION

To attain this object, the invention describes a high-pressure roller press of the generic type that is equipped with biased end plates, and with only single end roller fastened to the end plates vertically level with the roller gap, which single end roller is rotatable about its roller axis and laterally delimits the roller gap. Each of the two lateral end plates is consequently provided with a single such end roller so that a total of (only) two end rollers are present. The end roller axes are oriented perpendicular to the compression-roller axes or perpendicular to the fixed roller axis of the fixed roller (and perpendicular to the transport direction of the material through the roller gap).

The invention is based first on the discovery that it is advantageous to provide the basically known, force-loaded end plates (cheek plates), so that, unlike in the case of the solutions with limiting flanges on a roller, an oblique position of the rollers or an inclined position of the movable roller relative to the fixed roller can be permitted in a simple manner. This embodiment has the great advantage that overloading of the machine or of the filling funnel limiting devices is reliably avoided without a uniform supply of the feed material over the roller width having to be ensured. At the same time, according to the invention, the friction in the region of the high-compaction zone is reduced in that in each case a single end roller is integrated as a transport roller into these retractable end plates. Such a single end roller in the region of an end plate means that not a plurality of end rollers are one above the other, but only a single end roller is rotatably on the end plate in the region of the high-compaction zone. However, this embodiment does not exclude that such a single end roller is composed of a plurality of roller sections or roller parts that can be rotated next to one another about the same axis. Preferably, these end rollers or roller sections, possibly rotating next to one another about the same axis, have, however, a (one-piece) roller shell continuous over the width and the outer surface, so that in particular there is no risk of material being wedged in a gap between the individual end rollers or roller sections.

In a particularly preferred embodiment of the invention, the end plates, in addition to the respective end rollers, each have a particle-guide pocket that is formed in the end plate, namely above the end roller fastened to the end plate, so that the end rollers are acted upon by material from above via these particle-guide pockets. The recessed material-guiding pocket is set back with respect to an inner face of the end plate, and the inner face is the plane of the end plate facing the roller end face and oriented parallel to the roller end face. The particle-guide pocket consequently has a rear wall that is set back relative to this inner face and is spaced apart from the inner face (at least) in some regions and that is preferably curved. Particularly preferably, in a side view, the particle-guide pocket is funnel-shaped with a downwardly tapering width. Alternatively or additionally, the particle-guide pocket has a downwardly tapering depth, so that overall a funnel-shaped particle-guide pocket is realized, with which the material is fed from above to the transport roller fastened to the end plate.

As a result of these particle-guide pockets that are formed in the end plates and that are of particular importance in combination with the transport rollers, an excess of feed material or material to be ground is produced in the end-side, outer regions of the rollers and at the same time the location at which the friction between the feed material and the end plate occurs is extended out "outward" by the recessed rear wall of the particle-guide pocket from the roller end face. Thus, the material flows better at the roller edges and is better drawn into the roller gap. This counteracts the effect observed in practice in the case of conventional cheek plates or end plates, according to which the effect observed in the case of conventional "cheek plates or end plates" is counteracted and less material is drawn into the roller gap and thus also less material is comminuted or compacted. Overall, the effectiveness of the roller press is consequently improved over the width of the roller gap. At the same time, the friction in the region of the high-compaction zone is considerably reduced by rotation of the provided transport rollers and, on the one hand, wear is minimized and, on the other hand, material distribution over the gap width is improved. The throughput of the roller press is thus increased overall.

The transport roller on the for example spring-biased plate is consequently of particular importance in combination with the particle-guide pockets. The roller is preferably dimensioned and positioned in such a way that the upper apex of the roller is above the roller axis and/or in that the lower apex of the roller is below the roller axis or roller axes. In any case, the two transport rollers fastened to the two end plates are relative to the height-in the region of the compaction zone of the roller press. The zone of the working space of the roller press extends between the two rollers over a circumferential angle of −5° to +15° and is defined as the compaction zone, specifically in the direction of the roller gap and in relation to a straight line through the centers of the two rollers. The roll gap lies vertically level with the roller axes and consequently in each case at a circumferential angle of 0°. Consequently, the compaction zone is, by definition, the region that lies between +15° above the roller axis and −5° below the roller axis. The transport rollers are in the region of the roller axes and consequently also in the region of the compaction zone. Dimensioning and positioning of the transport rollers is preferably carried out in such a way that the upper apices of the rollers are within the compaction zone (based on the vertical position of the compaction zone). Alternatively or additionally, the lower apices of the rollers are below the compaction zone. The roller axes of the transport rollers are approximately vertically level with the roller axes).

The diameter of the end rollers is preferably adapted to the roller diameter of the compression rollers, in that the roller diameter is at least 5% of the roller diameter, preferably at least 10% of the roller diameter. The roller diameter may be for example about 5% to 35%, e.g. 10% to 30% of the roller diameter. The roll diameter of the compression rollers is typically between 1000 mm and 3000 mm, e.g. 1200 mm to 2000 mm. By way of example, the diameter of the (transport) roller can be at least 50 mm, preferably at least 100 mm, particularly preferably at least 200 mm. Thus, the roller diameter can be for example 50 mm to 1000 mm, preferably 100 mm to 600 mm, for example 200 mm to 450 mm.

The width of the transport or end roller is preferably greater than the maximum gap width of the roller gap and consequently greater than the preset zero gap plus at least the distance by which the roller gap opens during the machine operation. The width of the roller can be at least 1%, preferably at least 2%, of the compression-roller diameter, for example at least 50 mm, preferably at least 60 mm. Particularly preferably, the width of the end rollers is about 1% to 10%, for example 2% to 8% of the roll diameter. For example, the roller may have a width of 50 mm to 200 mm, e.g. 60 mm to 100 mm. The width of the (transport) roller means the width of the (circumferential) working surface of the compression roller and consequently the width of the body of the roller.

The end rollers are intended to reduce the lateral friction in the compaction zone or high-compaction zone. In addition, the end rollers are intended to transport additional material from the hopper or particle-guide pocket located above the roller into the gap and consequently convey material into the region of the roll gap. This is achieved, inter alia, by the corresponding dimensioning and also the positioning of the end roller at the described height. The effect can be further improved by providing the end rollers with a surface profiled or structured (on the outer surface of the roller). Thus for example pin-like wear elements (so-called “studs”) can be used for example from EP 0 516 952 [U.S. Pat. No. 5,269,477] for finishing of the roller surface of compression rollers of a particle-bed roller mill or that, according to DE 10 201 8 113 440, also use wear protection elements in the region of end/cheek plates.

The supply of the material to the rollers via the particle-guide pockets or material funnels can moreover be improved by the use of guide formations that are integrated in the particle-guide pockets in a suitable manner. Alternatively or additionally, the end plates can be provided with additional seal plates that run parallel to the inner face or in the inner face and partially cover the particle-guide pocket on the front side. These seal plates, that likewise improve the supply of the material from the particle-guide pockets into the region of the roller, are explained in more detail in the specific description.

In principle, it is possible to use transport rollers without a drive, so that the rollers are rotate passively by the material that has been added and moved by the compression rollers. Preferably, the end rollers (indirectly) are driven by the compression rollers by pressing the end rollers with their outer surfaces against the end faces of the compression rollers. This is because the outer surfaces of the end rollers are larger or wider than the roller gap, so that the rollers can be pressed with their radially outwardly facing surface or body surfaces (working surfaces) against the end faces of the compression rollers for example via the application of force to the end plates and thus can be driven via the rollers. However, it is also possible to provide the end rollers with a drive so that actively driven end rollers are used that are preferably driven at the same circumferential speed as the compression rollers. In this way, friction in the region of the transport rollers can be reduced particularly well. Optionally, the rotational speed or the circumferential speed may also be somewhat faster than that of the roller surfaces in order to optimize the conveying effect of the material in the roller gap.

The preferably provided realization of the recessed particle-guide pockets in the region of the end plates also results in material being pushed over the end faces of the rollers into the particle-guide pockets and over this path into the grinding gap. This has the advantage that the grinding gap is additionally supplied with material. It may be advantageous to additionally protect the end faces of the compression rollers against wear, so that, optionally in the region of the end faces, measures for reducing wear are provided that are usually used in the region of the outer surface of the rollers, for example a suitable armor. Optionally, structuring in the region of the end faces of the rollers may also be expedient in order to increase the effect of drawing in material.

The fact that, within the scope of the invention, an oblique position of the rollers relative to one another or an inclined position of the movable roller relative to the fixed roller is explicitly permitted is of particular importance. The compression roller presses the side end plate in a conventional manner to the side or back, so that the end plate rests with the end roller against the two compression-roller end faces or flanks. However, damage to the side end plate and the roller is not to be feared because the relative speed between the compression rollers on the one hand and end rollers is in any case lower than the relative speed between the compression roller and the end plate without rollers.

BRIEF DESCRIPTION OF THE DRAWING

The invention is explained below with reference to drawings that, however, only show one embodiment of the invention. Therein:

FIG. 3 is a top view of the structure shown in FIG. 2, FIG. 4 shows an end plate according to the invention in a perspective view from the inside and FIG. 5 is the end plate according to FIG. 4 in a perspective view from the outside.

SPECIFIC DESCRIPTION OF THE INVENTION

Figure 1:
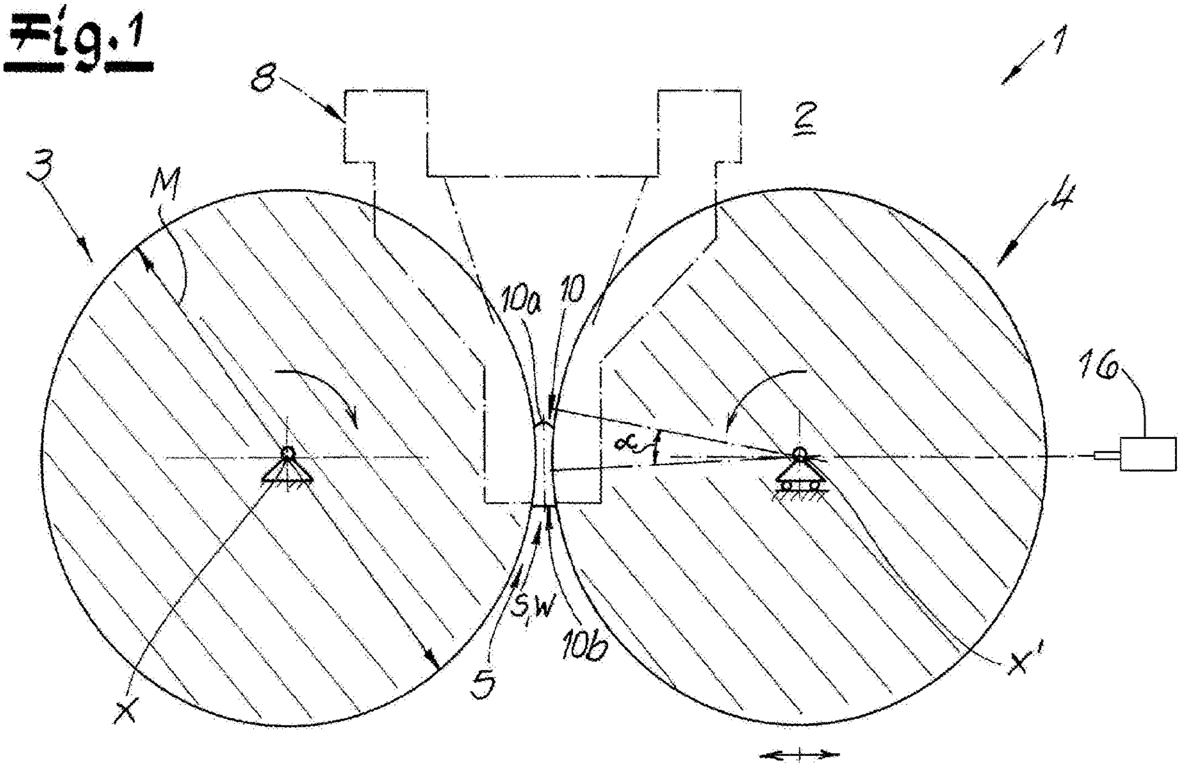
FIG. 1 is a greatly simplified schematic vertical section through both rollers of a roller press.

The drawing shows a high-pressure press 1 serving as a particle-bed compaction mill or crusher. It has a press frame 2 as well as two compression rollers 3 and 4 rotated in the directions of the arrows and mounted in the press frame 2. A compaction zone 5 with a roller gap S is formed vertically level with the roller axes X, X' between the compression rollers 3 and 4 and has a gap width W that is variable during operation of the roller press 1. This is because one of the compression rollers is a fixed roller 3 and the other is a compression roller 4 movable by a for example hydraulic actuator relative to the fixed roller 3 (in a horizontal plane), so that the gap width W of the roller gap S changes within certain limits during operation. The minimum roller gap S or the gap width W of the gap is preset until a certain pressure acts between the rollers. The roller axes X, X' are in a common horizontal plane and are oriented parallel to one another in a starting position (at "zero gap"). During operation, however, the movable roller 4 can tilt relative to the fixed roller 3 about a vertical axis and consequently in a horizontal plane, so that the roller axes X, X' are always at the same level and consequently in a horizontal plane during operation but can be oriented within this plane at a certain angle to one another.

The material is fed from above via a supply chute (not shown in more detail), is drawn into the compaction zone by the counter-rotation of the rollers, and is comminuted (or compacted) there under the action of the existing grinding pressure. The compaction zone 5 between the rollers is delimited at roller end faces by end plates 8 set laterally next to end faces of the compression rollers 3, 4 that are also referred to in practice as filling-funnel end plates or "cheek plates." These end plates 8 are movably fastened to the press frame 2, specifically with prestress, for example bear by springs 9 with force axially on the respective roller end faces 6. During operation, the end plates 8 are urged axially outward against the spring force, for example at B back against the force of the springs 9. This is essential because in such a roller press the already mentioned oblique position of the rollers 3 and 4 relative to one another is intentionally permitted.

A single respective end roller 10 is mounted on each of the two end plates 8 vertically level with the roller gap S and consequently vertically level with the roller axes X, X' to serve as a transport roller mounted rotatably about its roller axis Y and to laterally delimit the roller gap S. In addition, each of the two end plates 8 has an inner face 11 directed toward the respective roller end face 6 and oriented parallel to the roller end face 6. In this embodiment, a particle-guide pocket 12 that extends outward from the previously defined inner face 11 is formed in the respective end plate 8 above the end roller 10 fastened thereto, so that the end roller 10 can be acted upon from above by material in the particle-guide pocket 12. Consequently, the particle-guide pocket 12 has a face 13 set back with respect to the inner face 11 and spaced at least in regions from the inner face and in this embodiment is arcuately shaped both vertically according to FIG. 2 and horizontally according to FIG. 3. In the preferred embodiment shown, this particle-guide pocket 12 is thus funnel-shaped in a side view or in a perspective view from the inside (according to FIG. 4), i.e. it has a downwardly tapering width B. In addition, the particle-guide pocket has a downwardly decreasing depth T (compare FIG. 2). This configuration leads to the material being fed via the particle-guide pockets 12 from above axially into the region of the two transport rollers 10 laterally flanking the roller gap S. In the axial end, outer regions of the rollers 3, 4, produce an excess of material via the particle-guide pockets 12. The recessed rear wall 13 of the particle-guide pocket 12 transfers the effect of friction inhibiting flow of the material outward from the roll gap, so that the material on the compression-roller end faces is better fed and better drawn in and simultaneously friction is reduced in the high-pressure region 5 and at the same time is spread out along the compression zone.

Figure 2:
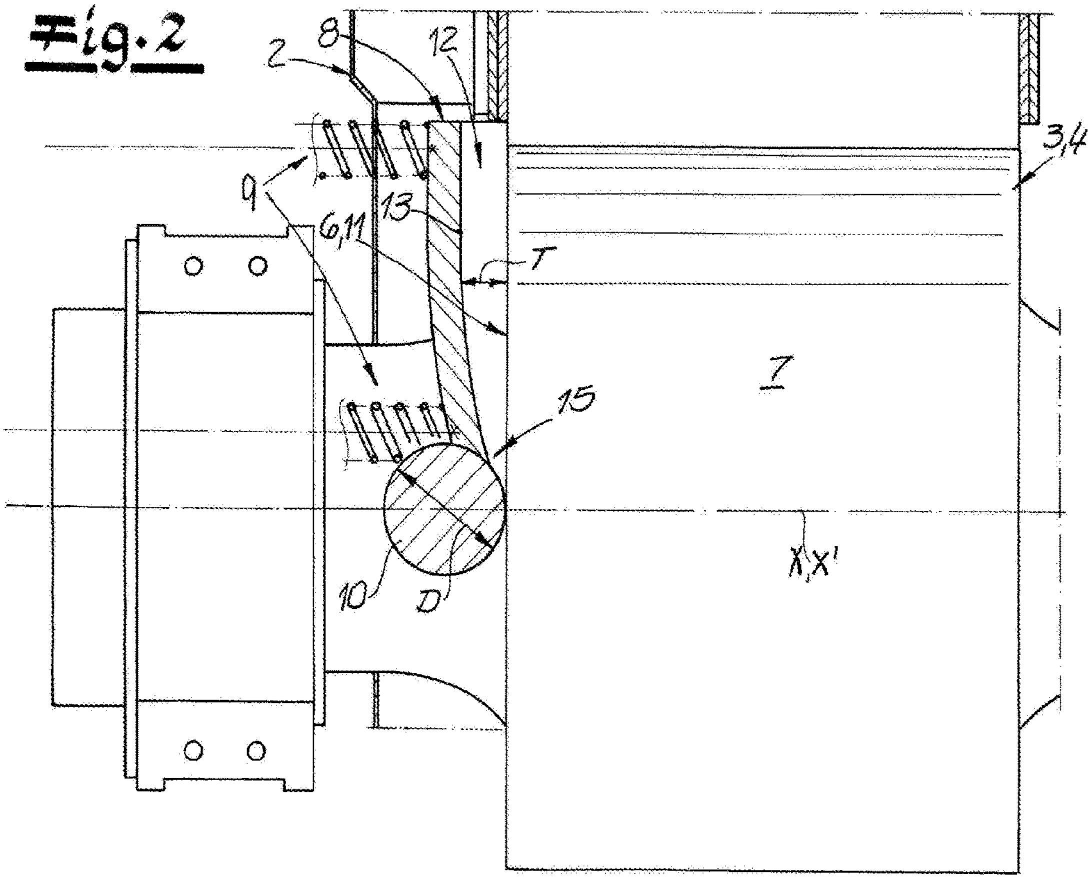
FIG. 2 is a vertical section through the roller gap of a roller press according to the invention in a more detailed view.

It can also be seen in FIG. 2 that an upper apex 10*a* of the end roller 10 is above the roller axis X or X'. A lower apex 10*b* of the end roller 10 is below the roller axis X or X'. In the illustrated embodiment according to FIG. 1, the upper apex 10*a* is within the compaction zone 5, while the lower apex 10*b* is below the compaction zone 5. According to FIG. 1 the compaction zone of the roller press extends between the two rollers 10 over a circumferential angle an of −5° to +15° with respect to a connecting line through the roller axes X, X'. Consequently, the compaction zone 5 by definition extends between +15° above the roller axis and −5° below the roller axis X, X'. In this case, the roller axis Y of the rollers 10 lies for example approximately at the level of the roller axes X, X' of the compression rollers 3, 4.

In any case, a width E of the rollers 10 is greater than the maximum gap width W and consequently greater than the zero gap of the roller gap S plus at least the distance by which the roller gap spreads to during the machine operation. Width E or roller width means the axial width, that is to say the width of the working outer surface of the rollers.

The outer surface 7 of the compression rollers 3, 4 is generally provided with a special surface finish, for example with a wear-resistant coating or jacket, in such a compaction roller. Details are not shown in the drawing. In preferred embodiments, the outer surface 14 of the rollers 10 can also be provided with a wear-resistant coating. The outer surfaces 14 of the rollers 10 can consequently have a wear-resistant design or have a wear armor. In the case of this wear armor of the rollers 10, it is possible to resort to known measures for wear armoring the roller surfaces. Thus for example a plurality of bolts can be integrated in a knob-like manner into the outer surface (stud lining). Alternatively, wear armor may be realized from a plurality of tile-like wear elements attached to the surface. In addition, wear resistance is considered by a built-up weld. The roller itself is always preferably made of steel and the wear armor is on the outer surface of this roller from a hard, wear-resistant material. Optionally or additionally, the outer surface 14 of the rollers can be equipped with a profiling or structuring. Details are not shown. Moreover, there is the possibility that the rollers 10 are each driven by a drive. Such a drive is not shown in the figures. Furthermore, gap formations for guiding the material onto the end roller 10 can be integrated in the particle-guide pockets 12, although such guide installations are also not shown. However, FIG. 4 shows in a simplified manner that the end plates 8 can each be provided with one or more additional sealing plates 17 that extend for example parallel to the inner face 11 or in the inner face 11 and partially cover the particle-guide pocket 12 on the front side. In this way, the feed of the material can be controlled in the region of the end roller 10 and in the region of the high-compaction zone 5.

Figure 5:
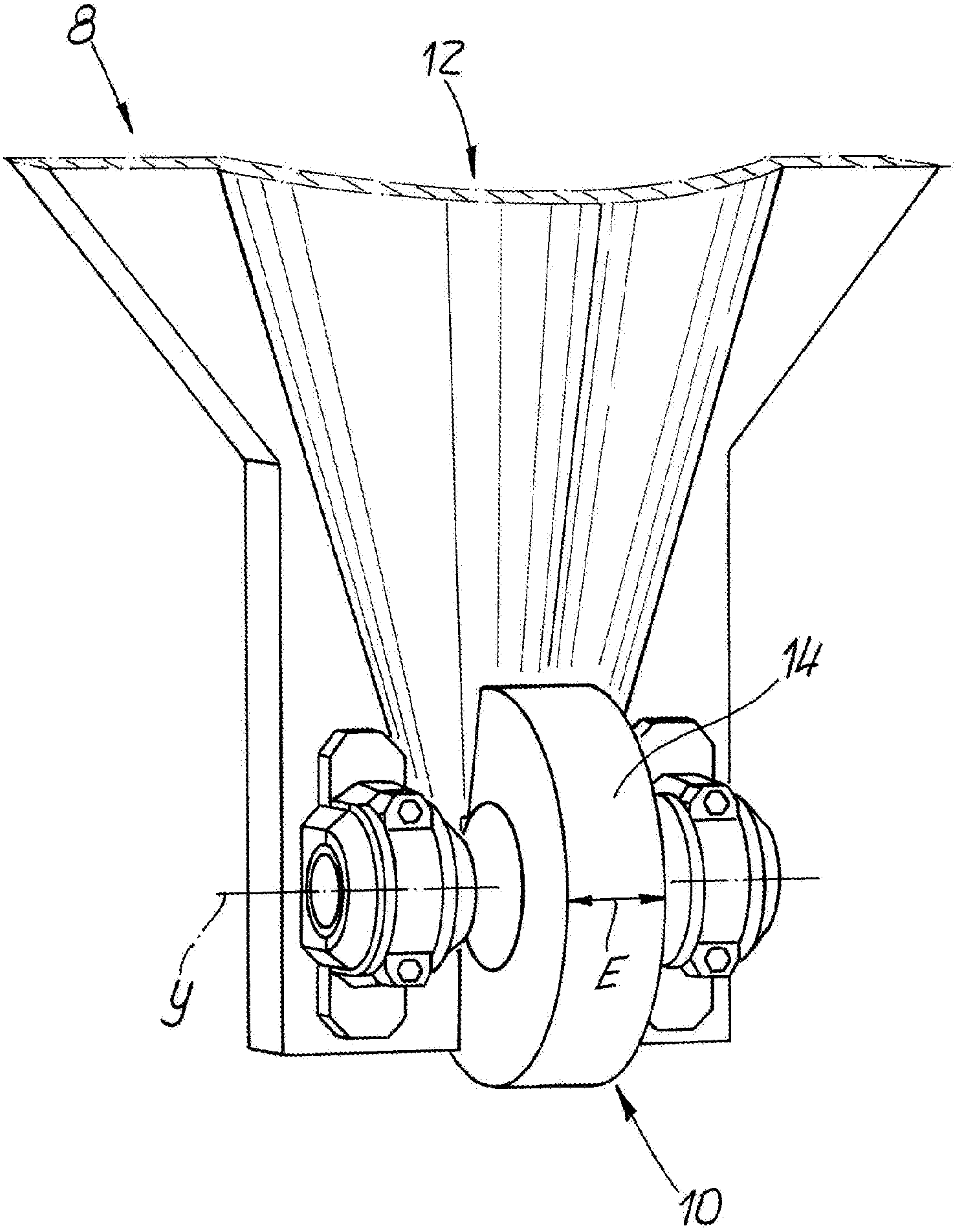

Finally, FIGS. 4 and 5 show that the end plates 8 each have an opening 15 through which the end roller 10 rotatable on the outer face of the end plate 8 passes, specifically into a region below the particle-guide pocket 12. The rollers 10 are consequently mounted on the outer face of the end plates 8 so as to be rotatable about an axis Y.

The end roller 10 or the cylindrical body thereof is thus in a pocket-like recess 12' of the end plate that is set back of the particle-guide pocket 12, i.e. the funnel-shaped particle-guide pocket 12 opens into the indentation 12' or into the recess 15 for the end roller 10 on the underside, and the end roller 10 or the body thereof engages through the opening 15.

Moreover, it is optionally also possible to equip the end plates, e.g. their inner face 11 and the particle-guide pockets 12, with wear armor. The end plates can be made of steel for example and wear armor can be on the respective surfaces.

The invention claimed is:

1. A high-pressure roller press comprising a press frame;

compression rollers rotatable about respective roller axes in the press frame, each having axially opposite roller ends each in turn having an end face and together forming a compaction zone with a roller gap vertically level with the roller axes and having a gap width that is variable during operation of the roller press;

two end plates axially flanking the compaction zone at the roller ends, the end plates being mounted on the press frame so as to be movable and being prestressed to shift axially outward away from the respective roller end faces against a prestress force during operation of the roller press;

single end rollers rotatable about respective end-roller axes on the end faces to axially delimit the roller gap and mounted on the end plates vertically level with the roller gap, the end plates each having an opening through which the respective end roller passes into or below particle-guide pockets formed between inner faces of the end plates and the end faces of the compression rollers; and means for feeding a material to be pressed to the particle-guide pockets.

2. The roller press according to claim 1, wherein the inner faces of the end plates confront the respective end faces of the compression rollers and form therewith a respective particle-guide pocket set with respect to the inner face of the respective end plate above the respective end roller fastened thereto so that the respective end roller can be engaged from above by the material in the particle-guide pocket.

3. The roller press according to claim 2, wherein the means is formed by respective guides feeding the material to the particle-guide pockets.

4. The roller press according to claim 2, wherein the particle-guide pockets are each funnel-shaped in side view with a width tapering downward.

5. The roller press according to claim 4, wherein the particle-guide pockets are each of downwardly decreasing depth parallel to the axes of the compression rollers.

6. The roller press according to claim 1, wherein an upper apex of each of the end rollers is above the roller axes or a lower apex of each of the end roller is below the roller axes.

7. The roller press according to claim 1, wherein an upper apex of each of the end rollers is within the compaction zone or a lower apex of each of the end rollers is below the compaction zone.

8. The roller press according to claim 1, wherein the axes of the end rollers are vertically level with the roller axes of the compression rollers.

9. The roller press according to claim 1, wherein a diameter of each of the end rollers is at least 5% of a diameter of each of the compression rollers.

10. The roller press according to claim 1, wherein a diameter of each of the end rollers is at least 50 mm.

11. The roller press according to claim 1, wherein the width of each of the end rollers is 1% to 10% of a diameter of each of the compression rollers.

12. The roller press according to claim 1, wherein a width of each of the end rollers is at least 50 mm.

13. The roller press according to claim 1, wherein each of the end rollers has a profiled or structured outer surface.

14. The roller press according to claim 1, further comprising:

wear armor on an outer surface of each of the end rollers.

15. The roller press according to claim 1, wherein each of the end rollers is rotated about its axis by the compression rollers and is pressed against the respective end faces of the rollers by the respective end plate.

16. The roller press according to claim 1, further comprising:

drives rotating the end rollers.

17. A high-pressure roller press comprising:

a press frame;

compression rollers rotatable about respective roller axes in the press frame, each having axially opposite roller ends in turn having end faces, and together forming a compaction zone with a roller gap vertically level with the roller axes and having a gap width that is variable during operation of the roller press;

two end plates axially flanking the compaction zone at the roller ends, the end plates being mounted on the press frame so as to be movable and being prestressed to shift axially outward away from the roller end faces against a prestress force during operation of the roller press, the end plates each having an inner face confronting the respective end face and forming therewith a respective particle-guide pocket set back with respect to the inner face of the respective end plate above the respective end roller fastened thereto so that the respective end roller can be engaged from above by material via the particle-guide pocket;

respective single end rollers rotatable about respective end-roller axes to axially delimit the roller gap and mounted on the end plates vertically level with the roller gap; and respective seal plates on the end plates extending parallel to the respective inner faces and partially covering the particle-guide pocket on the front face.

* * * * *